April 28, 1964     O. P. LIEBREICH     3,130,825
TRANSFER SPRING FOR COASTER BRAKE
Filed April 14, 1961
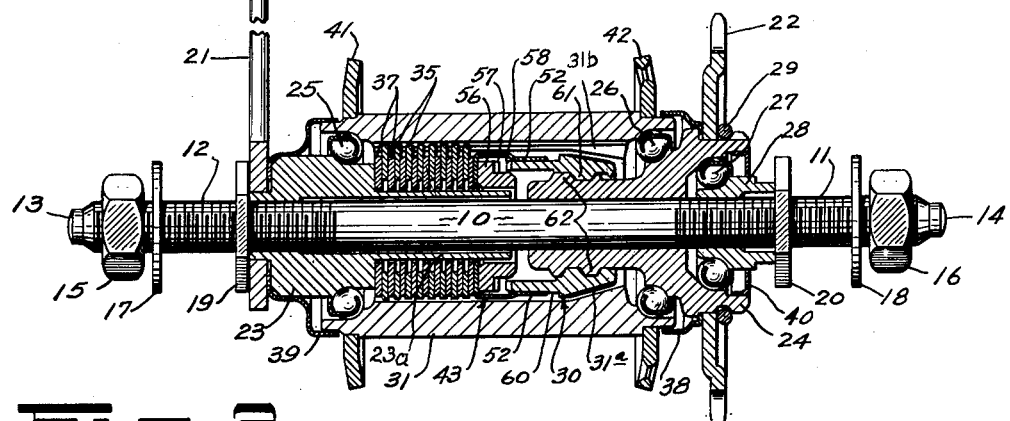
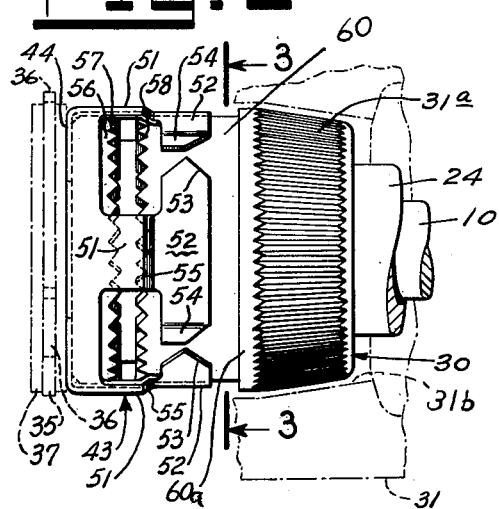
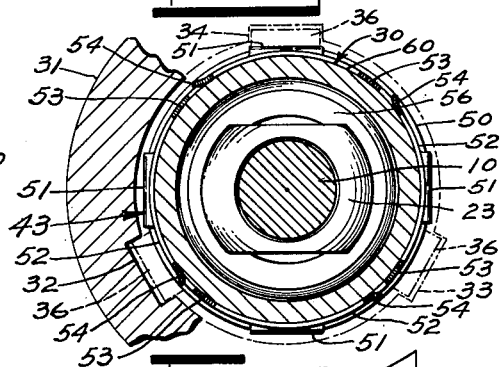
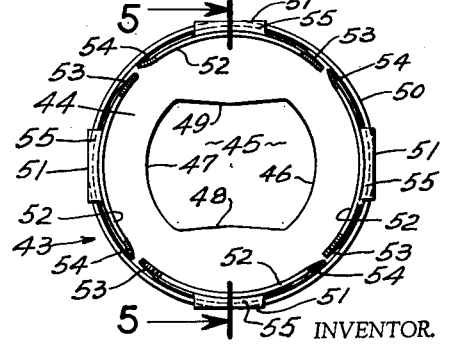
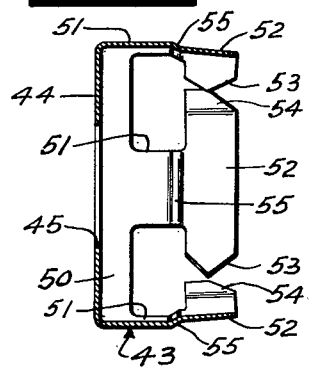
INVENTOR.
OSCAR P. LIEBREICH
BY
H. G. Manning
ATTORNEY United States Patent Office 3,130,825
Patented Apr. 28, 1964

1

3,130,825
TRANSFER SPRING FOR COASTER BRAKE
Oscar P. Liebreich, Waterbury, Conn., assignor to The Mattatuck Manufacturing Company, Waterbury, Conn., a corporation of Connecticut
Filed Apr. 14, 1961, Ser. No. 103,097
8 Claims. (Cl. 192—6)

This invention relates to clutch retarding mechanisms, and more particularly to an improved multiple disk safety coaster brake for bicycles and other mechanisms.

One object of the present invention is to provide a coaster brake of the above nature having an improved form of friction retarding transfer spring surrounding the brake actuator and connector located within the hub shell of said coaster brake.

A further object is to provide a transfer spring of the above nature, which serves to insure the desired frictional restraint upon said connector in its forward driving position, and which will engage the stack of brake disks during the braking operation.

A further object is to provide an improved transfer spring which is cup-shaped and has a series of circumferential pads for engaging the connector frictionally with sufficient tightness to prevent rotation of said connector at such times as rotation is not desired, and yet will engage the brake actuator sufficiently lightly to enable the lag spring to be rotated about the connector when the hub shell is rotating forwardly for driving the bicycle.

A further object is to provide a transfer spring of the above nature which will be relatively simple in construction, inexpensive to manufacture, easy to install and manipulate, compact, ornamental in appearance, and very efficient and durable in use.

With these and other objects in view, there has been illustrated on the accompanying drawings, one form in which the invention may conveniently be embodied in practice.

In the drawings:

FIG. 1 represents a longitudinal sectional view of a coaster brake mechanism embodying the present invention.

FIG. 2 is a fragmentary side view of the same on an enlarged scale, showing the improved transfer spring as it appears when assembled upon the brake actuator and connector of the coaster brake.

FIG. 3 is a fragmentary cross-sectional view, taken along the line 3—3 of FIG. 2, looking in the direction of the arrows, and showing a portion of the outer hub shell.

FIG. 4 is an end view of the transfer spring, shown by itself.

FIG. 5 is a cross-section of the same, taken along the line 5—5 of FIG. 4, looking in the direction of the arrows.

The general structure of coaster brake herein illustrated, is well known, and is disclosed in the expired patent to Murden, No. 2,049,972 for Retarder, dated August 4, 1936.

One disadvantage of the old type of lag transfer spring disclosed in the Murden patent, 2,049,972, was that the curved lugs on the ends of the lag spring, under repeated bendings during use, were likely to break off and cause serious accidents due to the fact that the brake would not function when this occurred. This disadvantage is entirely eliminated by the present improved cup-shaped transfer spring herein disclosed.

Referring now to the drawings in which like reference numerals denote corresponding parts throughout the several views, the numeral 10 indicates a horizontal stationary axle of a bicycle or other machine upon which the coaster brake is to be mounted.

2

The axle 10 is provided with opposite threaded end sections 11, 12, which have reduced unthreaded tips 13, 14, the usual nuts 15, 16, 19, 20, mounted on the threaded sections 11, 12, and the usual washers 17, 18 also located upon said threaded sections 11, 12.

The numeral 21 indicates the usual brake arm, and the numeral 22 shows a sprocket wheel by which the hub shell 31 is driven forwardly by means of a sprocket chain, not shown.

The numeral 23 indicates a tubular disk carrying anchor member, having a reduced extension 23a, and the numeral 24 designates a tubular driver of standard construction.

The numerals 25, 26, 27, indicate three sets of ball bearings of the construction commonly employed in coaster brakes of this general nature.

The numeral 28 indicates a cone which serves to simultaneously adjust all three sets of the ball bearing 25, 26, 27, and the numeral 29 indicates an open spring wire snap ring for locking the sprocket wheel 22 in operating position, as clearly shown in FIG. 1 of the drawing.

Provision is also made of a rotatable and longitudinally slidable threaded tubular connector 30 having a knurled conical end 31a for engaging a smooth conical socket 31b on the hub shell 31, when the bicycle is to be driven forwardly. The connector 30 has three steep pitch interior thread segments 61, shown in FIG. 1, which engage three similar exterior thread segments 62 on the driver 24.

Provision is also made of a usual tubular brake actuator 56 which is slidably and nonrotatably mounted upon the extension 23a of the anchor member 23, and has end teeth 57 adapted to intermesh with corresponding end teeth 58 on the connector 30, so that when the latter is forced to the left, as viewed in FIG. 1, it will cause said actuator 56 to squeeze together two sets of alternating bronze and steel brake disks 35, 37, with the result that the rotation of the hub shell 31 will be retarded.

Each of the braking disks 35 is provided with three radial lugs 36 which are adapted to be located in three longitudinal grooves or keyways 32, 33, 34 of the hub shell 31, as clearly shown in FIG. 3 of the drawings. The intermediate steel brake disks 37 are keyed to the anchor extension 23a in the usual manner.

At the ends of the hub shell 31, provision is made of a pair of usual dust excluding caps 38, 39 and an end plate 40 to protect the ball bearing 27, as clearly shown in FIG. 1.

Provision is also made of a pair of spoke flanges 41, 42, having rims slightly offset so as not to interfere with the lay or alignment of the spokes, not shown.

The improved lag transfer spring 43 forming the present invention is made in cup-shape, having a flat base 44 within which is an oblong hour-glass shaped hole 45, having circular ends 46, 47 and inwardly extending angular sides 48, 49, so as to provide a nonrotatable connection with the oblong anchor extension 23a. Adjoining the base 44 is a cylindrical rim 50, from which extend four spring necks 51, to which are secured four arcuate friction pads 52, located around the periphery of the transfer spring 43, and which pads are adapted to surround and engage the cylindrical surface 60 of the connector 30.

Each of the arcuate pads 52 of the lag transfer spring 43 is provided with a V-shaped scraper arm 53 at one end, and an outwardly curled lubricant feeding arm 54 at the other end thereof. The pads 52 are offset inwardly slightly from the cylindrical rim 50 (FIG. 5), being joined to the necks 51 by inclined shoulders 55 whereby, when assembled (FIG. 2), the transfer spring 43 will be substantially flush with the cylindrical end section 60a of the conical surface 31a of the connector 30.

It will be understood that the raised curved tips 54 of the pads 52 will form leading edges for permitting the lubricant contained within the coaster brake to flow between the surfaces of the pads 52 and the cylindrical surface 60 of the connector 30, thus reducing the friction therebetween during pedalling. During back pedalling, however, the opposite V-shaped tips 53, which have sharp edges fitting closely against the cylindrical surface 60 of the connector 30, will scrape the lubricant from said surface and increase the friction therebetween. It will thus be seen that in normal operation, the four pads 52 of the transfer spring 43 will exert light friction against the cylindrical surface 60 of the connector 30 under forward pedalling of the bicycle. When, however, the operator urges the pedal backwardly, the friction will be increased, and the connector 30 will be rotated and automatically forced to the left against the brake actuator 56 until the teeth 58 abut the teeth 57. The connector 30 will thus be positively prevented from rotation.

A further feature of the invention is that the pointed and curved tips 53, 54 of the pads 52 are located in close proximity to each other, (about .0075″) when unassembled, so as to prevent the transfer springs, which have a thickness of about .025″, from becoming interengaged between the tips 53, 54 of the adjacent pads 52 during tumbling, heat treating, and drying, and causing what is known as "cobbing," which would be likely to occur when said springs are stacked in a barrel or packaged.

*Operation*

In the operation of the invention, the torque applied to the triple threads 62 of the driver 24 and the slip resistance of the transfer spring 43 will cause the knurled connector sleeve 30 to travel toward the hub shell taper 31b until it wedges securely in the hub shell 31. The pedal force exerted by the rider will then be transmitted to the hub shell 31, resulting in forward motion of the bicycle.

While pedalling, the sprocket driver 24, the brake actuator 56, the hub shell 31 and the brake disks 35 will revolve as a unit about the stationary axle 10, resulting in a positive nonslip drive connection.

In coasting, the connector 30 will be released from the hub shell 31 permitting the latter and the eight freely rotating brake disks 35 to revolve for "free wheeling" without brake drag.

The back pedalling force during braking is transmitted as torque in the opposite direction through the triple threads of the sprocket driver 24. The slip resistance of the transfer spring 43 will then temporarily cause the connector 30 to travel away from the taper 31b of the hub shell 31 until it engages the mating serrated toothed actuator 56. At this point, the full back pedalling force will be applied to the stack of brake disks 35 and 37 through the actuator 56 and the transfer spring 43, and will provide smooth controlled braking action which is transmitted through the brake arm 21 and its assembly to the anchorage therefor in the frame of the bicycle.

One advantage of the present invention is that after braking is no longer desired, the transfer spring 43, the actuator 56, and the connector 30 will automatically move as a unit away from the stack of brake disks 35, 37, instantly releasing all pressure on said disks for free wheeling or coasting and without any brake drag.

Moreover, the outer edges of the teeth 58 of the connector 56 are beveled to allow the arcuate pads 52 to be sprung apart during assembly.

Also, is desired, the free edges of the arcuate pads 52 may be outwardly flared slightly to facilitate the assembly of the transfer spring 43 over the actuator 56 and upon the reduced cylindrical section 60 of the connector 30.

While there has been disclosed in this specification one form in which the invention may be embodied, it is to be understood that this form is shown for the purpose of illustration only, and that the invention is not limited to the specific disclosure, but may be modified and embodied in various other equivalent forms without departing from its spirit. In short, the invention includes all the modifications and embodiments coming within the scope of the following claims.

Having thus fully described the invention, what is claimed as new and for which it is desired to obtain Letters Patent is:

1. In a coaster brake for a bicycle or other machine having an axle, a tubular driver mounted on said axle, a hub shell rotatable on said axle, a tubular connector having end teeth surrounding said driver and having a serrated forward conical surface for detachable engagement with a smooth conical tapered socket in said hub shell, said driver having steep threads engaging corresponding threads on said connector, a tubular brake actuator adjacent said connector and having end teeth for detachable engagement with the end teeth of said connector, a tubular anchor member on said axle having a nonrotative connection with said actuator, braking means on said anchor member, a cup-shaped transfer spring member embracing said connector and said actuator, and means operated by pressing the bicycle pedal forwardly to cause forward motion of said connector into wedging engagement with said hub shell socket to rotate the latter and cause the bicycle to travel forwardly, means actuated by reverse pedalling to cause said connector to move rearwardly into toothed engagement with said actuator to squeeze said brake means to stop the bicycle, and means to permit coasting or free wheeling when said connector is in neutral position.

2. The invention as defined in claim 1, in which said transfer spring has a plurality of spaced circumferential resilient arcuate pads frictionally embracing said connector.

3. The invention as defined in claim 2, in which said pads are T-shaped.

4. The invention as defined in claim 3, in which said T-shaped pads are connected to the base of said cup-shaped transfer spring by a series of necks.

5. The invention as defined in claim 4, in which said necks are connected to said base by a cylindrical rim.

6. The invention as defined in claim 5, in which each of said T-shaped pads is provided on one side with a lubricant feeding arm having an out-curled tip, whereby when the bicycle pedal is pressed forwardly by the rider, lubricant will be caused to flow under the raised tips of said feeding arms to reduce the friction between said arms and the connector and cause the latter to move into wedging engagement with said hub shell and produce forward motion of said bicycle.

7. The invention as defined in claim 5, in which each of said T-shaped pads is provided on one side with a lubricant scraping arm in close contact with the surface of said connector, whereby when the bicycle pedal is pressed rearwardly by the rider the lubricant will be excluded from the surface of said connector and the friction thereon will be increased, causing the threaded connector to travel away from the hub shell taper until the toothed end of said connector comes into engagement with the toothed actuator and allows the back pedal force to squeeze the braking means and retard the motion of the bicycle.

8. The invention as defined in claim 5, in which each of said T-shaped pads is provided on one side with a lubricant feeding arm having an out curled tip whereby when the bicycle pedal is pressed forwardly by the rider, lubricant will be caused to flow under the raised tips of said feeding arms to reduce the friction between said arm and the connector and cause the latter to move into wedging engagement with said hub shell and produce forward motion of said bicycle, and in which each of said T-shaped pads is provided on its other side with a lubricant scraping arm in close contact with the surface of said connector, whereby when the bicycle pedal is pressed rearwardly by the rider the lubricant will be excluded from the surface of said connector and the friction thereon will be increased causing the threaded connector to travel away from the hub shell taper until the toothed end of said connector comes into engagement with the toothed actuator and allows the back pedal force to squeeze the braking means and retard the motion of the bicycle.

References Cited in the file of this patent

UNITED STATES PATENTS

| | | |
|---|---|---|
| 1,947,961 | Winkler | Feb. 20, 1934 |
| 2,049,880 | Winkler | Aug. 4, 1936 |
| 2,049,972 | Murden | Aug. 4, 1936 |
| 2,236,206 | Becker | Mar. 25, 1941 |
| 3,007,239 | Lermont | Nov. 7, 1961 |